United States Patent [19]

Kensrue

[11] 4,295,593

[45] Oct. 20, 1981

[54] WELDING SEAM BACK-UP MEANS

[76] Inventor: Milo M. Kensrue, 601 Lido Park Dr., 8B, Newport Beach, Calif. 92663

[21] Appl. No.: 78,339

[22] Filed: Sep. 24, 1979

[51] Int. Cl.³ .............................................. B23K 37/06
[52] U.S. Cl. ..................................... 228/50; 219/160; 248/206 A
[58] Field of Search ............... 228/49 B, 50; 219/160; 269/8; 248/206 A

[56] References Cited

U.S. PATENT DOCUMENTS

| 2,584,072 | 1/1952 | White | 228/50 |
| 2,792,626 | 5/1957 | Chyle | 228/50 X |
| 3,460,736 | 8/1969 | Cadle et al. | 228/50 |
| 3,518,884 | 7/1970 | Wood | 248/206 A X |
| 3,593,982 | 7/1971 | Price | 269/8 |
| 3,662,144 | 5/1972 | De Haeck | 219/160 X |

FOREIGN PATENT DOCUMENTS

| 66237 | 4/1969 | Fed. Rep. of Germany | 219/160 |
| 50-8430 | 4/1975 | Japan | 228/50 |

Primary Examiner—Gil Weidenfeld
Assistant Examiner—K. J. Ramsey
Attorney, Agent, or Firm—Whann & McManigal

[57] ABSTRACT

A welding seam back-up arrangement for mounting on the backside of the adjacently positioned edge margins of work members or workpieces that are to be joined by a weld seam, which is selectively variable as to length to accommodate it to weld seams of different lengths, and which comprises a plurality of tape engaging elongate channel members hingedly or otherwise interconnected in end-to-end relation and adapt it to be longitudinally positioned over a seam back-up tape of a material such as fiberglass, an elongate bar of a material having high heat conductivity characteristics, such as copper or aluminum, being interposed in the channel in underlying relationship to the tape to form a heat sink for conducting heat away from the weld seam during a welding operation. The channel members and their associated heat sinks are secured in operative relationship with respect to the adjacent edges of the workpieces to be welded by means of appropriate holding brackets placed at spaced intervals along the seam, each bracket being provided with at least one magnet for releasable attachment to an adjacent face of one of the workpieces and containing spring means for applying a pressure against the associated channel member to hold a back-up tape in its operative position.

12 Claims, 6 Drawing Figures

WELDING SEAM BACK-UP MEANS

BACKGROUND OF THE INVENTION

The present invention relates generally to the art of welding.

It has heretofore been generally known to utilize back-up tapes of either a relatively thick ceramic material or a flexible fiberglass tape material for the making of one-side welds and root pass back-up of two-side welds in connection with inert gas welding (TIG or MIG). In the known arrangements, provision is usually made for securing the back-up tape in bridging relation over the adjacently spaced edges of the workpieces that are to be welded along a seam line.

In some of the known embodiments, the back-up fiberglass tape or ceramic sections are secured to an aluminum foil backing which has marginal lateral edge portions that extend beyond the respective adjacent edges of the back-up material and are coated with a pressure sensitive adhesive covered with a removable liner. A roller or other means is generally used in this type of arrangement to obtain a good adhesion of the foil edges to the surface of the associated workpieces.

In another known embodiment, a granular back-up flux is molded and mounted on a flexible adhesive tape.

In use, it has been found that the use of an adhesive entails certain time consuming preparation of the workpiece surfaces in order to assure that such surfaces are properly cleaned. If the tape adhesive engages with a dirty surface, it will not effectively adhere to the workpiece, and the back-up strip will not be held in a proper position in relation to the welding seam. For this reason, it will be appreciated that although the ceramic or fiberglass back-up tape, as described above, might not be damaged in the welding operation and might be in itself reusable, the contamination of the adhesive surface of the foil would prevent reuse of the mounting foil with the back-up tape as a composite assembly. Thus, the known arrangement as just described entails a rather costly procedure, particularly in those cases in which a large number of welds are to be made as a part of a production schedule.

Attempts have therefore been made to provide an arrangement which would overcome the disadvantages of the above mentioned procedure, and for such purpose it has heretofore been proposed to utilize a rather cumbersome and complicated clamping bracket which could be magnetically attached to the surfaces of the workpieces to be welded. In one known bracket structure, the bracket includes an adjustable screw means which is carried by the bracket and is manually operable to mechanically forcibly hold one or more channel shaped holders in an operative position over the weld line, each holder being adapted to hold a plurality of ceramic back-up sections in pressure engagement over the adjacent edges of the workpiece along the seam line. While these clamping brackets and holders are reusable, and in this respect are an improvement over the use of an adhesive foil backing, the complexity and construction of the clamping brackets makes them relatively more expensive.

Tests conducted by applicant have indicated that the known concepts and devices do not embody all that could be desired for the most efficacious production of one-side welds. For example, in order to most efficiently utilize the less expensive fiberglass tapes, it is an important consideration that the tape back-up means should embody an effective heat sink means for conducting heat away from the tape during the welding operation, in order to limit and control the extent of tape melting and the formation of a smooth and uniform back surface of the deposited weld material. The presently used foil mounted tapes and channel shaped holders for the ceramic sections do not have the requisite high heat conducting characteristics to form a sufficiently effective heat sink to permit the use of the less expensive flexible fiberglass tapes.

Briefly, according to the present invention, it is proposed to utilize channel shaped holders which are designed to receive the flexible fiberglass tape lengthwise therein, and in which bars of a high heat conducting material such as copper or aluminum are interposed between the tape and the channel holder in underlying relation to the tape. Also, instead of the complicated magnetically attachable brackets with their pressure applying screws, it is proposed to provide in the present invention a simplified holding bracket in which a bowed spring mounts a magnet at each end. By placing the spring in tranversely extending position of engagement with a channel shaped holder, the spring will be flexed by movement of its end magnets into engagement with adjacent surfaces of the associated work pieces in such a manner as to forcibly apply a holding pressure against the channel holders and the associated fiberglass tape.

SUMMARY OF THE INVENTION

The present invention is more specifically concerned with improvements and means for holding a flexible fiberglass back-up tape in an operative position on the back side of a weld seam during the making of a one-side weld.

Having in mind the inherent inadaptability of the known back-up structures for such purpose, it is one object of the present invention to provide an elongate holder for a fiberglass back-up welding tape, which embodies a highly effective heat sink for conducting heat away from the back-up tape during a welding operation.

It is a further object to provide in a weld back-up tape arrangement, an elongate channel-like tape holder adapted to longitudinally receive a flexible fiberglass back-up tape therein, and in which an elongate heat sink bar of copper, aluminum or the like is interposed in the channel in underlying relation to the tape.

A still further object is to provide a weld back-up tape arrangement in accordance with the preceding object in which an attachable holding bracket of simplified construction is utilized to releasably retain the back-up tape in an operative position with respect to the weld seam.

Another object is to provide a weld back-up holding arrangement having an improved and simplified magnetically attachable means for holding the back-up tape in an operative position, and in which holding magnets are mounted at the opposite ends of an elongate strap-like spring.

It is also an object to provide in a weld back-up tape holding arrangement, an elongate tape holder structure having high heat sink capabilities, and wherein the respective holder structures are arranged for releasable end-to-end interconnection to provide an overall variable holder length that is compatible with a desired weld seam length.

Further objects and advantages of the invention will be brought out in the following part of the specification, wherein detailed description is for the purpose of fully disclosing preferred and modified embodiments of the invention without placing limitations thereon.

BRIEF DESCRIPTION OF THE DRAWINGS

Referring to the accompanying drawings, which are for illustrative purposes only.

DESCRIPTION OF PREFERRED AND MODIFIED EMBODIMENTS

Figure 1:
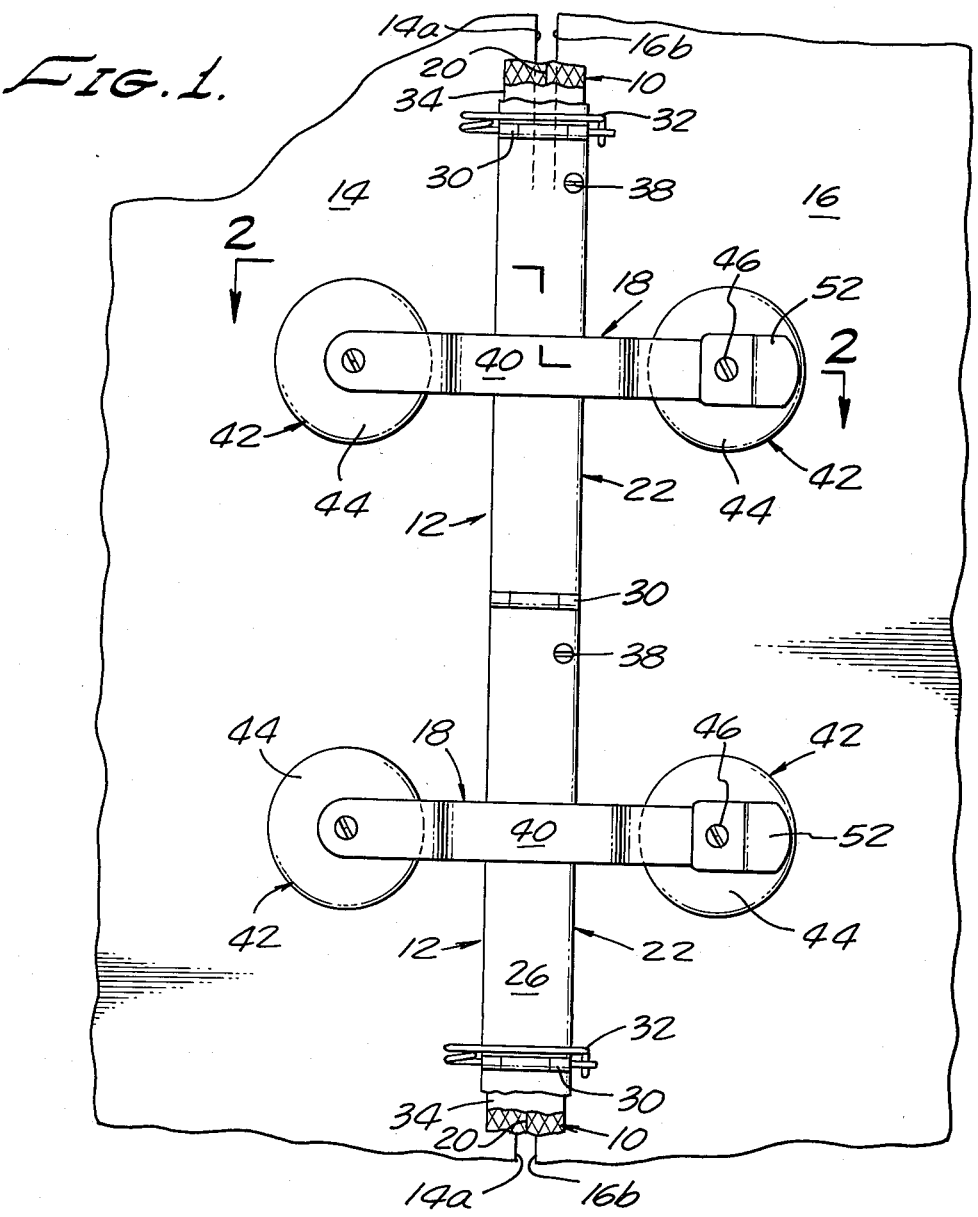
FIG. 1 is a fragmentary plan view showing welding seam back-up means according to the present invention, as applied to the edge margins of workpieces that are to be joined by a weld seam.

Referring more specifically to the drawings, for illustrative purposes, the invention is shown in FIG. 1 as comprising generally an elongated continuous back-up tape 10 for fiberglass or other appropriate material, one or more tape holding structures 12 which are known as being articulately interconnected in end-to-end relation, and as being retained in an operative position with respect to a weld seam line between adjacently disposed edges 14a and 16b of generally plate-like workpieces 14 and 16, respectively. The interconnected tape holding structures 12 are retained in operative position with respect to the seam line by means of a series of releasably attachable brackets as generally indicated in each case by the numeral 18.

Figure 2:
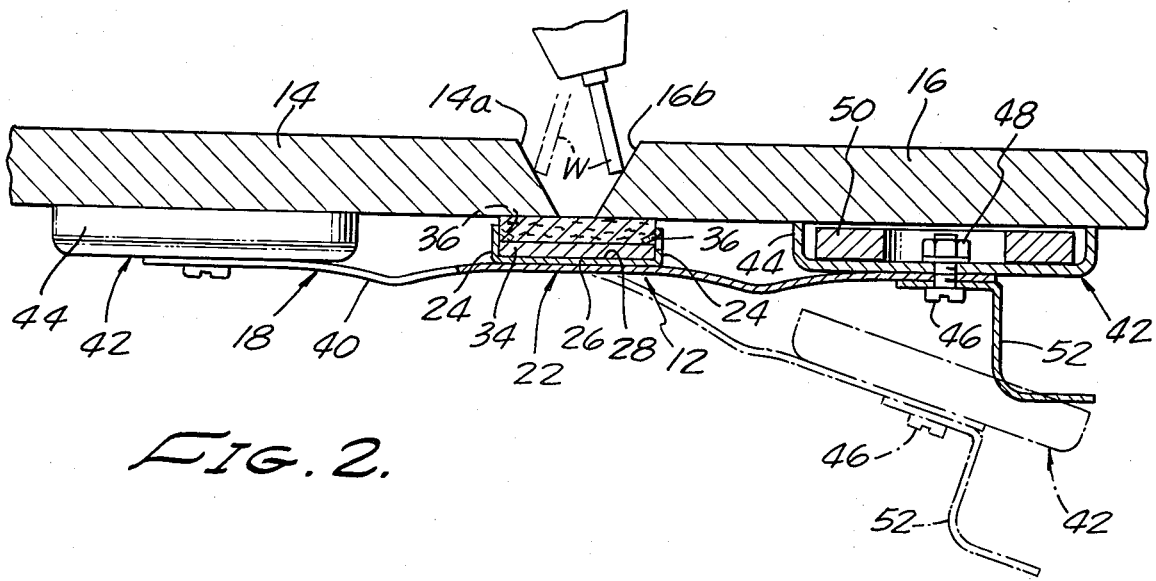
FIG. 2 is an enlarged fragmentary transverse section taken substantially on line 2—2 of FIG. 1.

As best seen in FIG. 2, the edges 14a and 16b of plates that are to be connected by the weld, may be beveled to provide a generally v-shaped groove with a wide opening on the front surface of the workpieces and a more narrow opening on the back surface of the workpieces for receiving the melted welding material, as an electrode welding wire W is transversely oscillated in the groove. As will be seen, the back-up tape 10 is longitudinally centrally aligned with the welding groove by means of a longitudinally extending medial line 20 formed on the opposed surfaces of the tape. The use of a back-up tape as just described enables the efficacious production of one-side welds and the root pass back-up of two-side welds in the conventional inert gas welding processes as conventionally known in the industry.

By means of the improvements embodied in the present invention, which will be described subsequently more fully, the operative procedures and effectiveness of the weld will be greatly augmented.

As best shown in FIGS. 1 and 2, the tape holding structure 12, in its simplified form, comprises an elongated channel member 22 which is preferably formed of a relatively light metallic material that can be stamped or otherwise deformed to provide a channel member having opposed side flanges 24; these flanges having a connecting bridging wall 26 that defines the bottom of a longitudinally extending channel 28. Provision is made for interconnecting the channel members in articulated end-to-end relation by appropriate hinges, as indicated at 30. A hinge having a permanent hinge pin may, if desired, by utilized to connect two of the tape holding channel members 22 into a permanently connected pair, while removable hinge pins, a generally indicated at 32, may be utilized to connect the pairs into a longer articulated assembly to accommodate back-up tapes of greater length, as needed. Of course, if desired, removable hinge pins 32 may be utilized for all of the hinge connections.

It will be appreciated that the channel member 22, as thus constructed, may be utilized per se for the retention of the fiberglass back-up tape in its operative position with respect to the weld seam. However, in order to most effectively utilize such a back-up tape, it has been found that more effective and desirable shaping of the weld on the back surface may be accomplished by the provision of an associated heat sink to control and carry generated heat away from the weld material during the welding operation. The requisite heat sink might be provided by making the channel member of a metal which has a high heat conducting characteristic. As illustrated, however, the heat sink is shown as being obtained by the provision of a separate elongate bar 34 of copper, aluminum or other suitable material, which is positioned within the channel 28 of each channel member 22 in underlying relation to the back-up tape 10 therein, in such a manner that the bar has an interfacing surface with respect to the back-up tape.

The bar 34 is releasably retained within its associated channel member 22 by a series of inwardly upset nibs 36 formed in the side flanges 24 of the channel member, and being so positioned that they will project over the outer surface edge margins of the bar and retain it in engagement with the bridging 26 of the channel member, while at the same time enabling endwise removal of the bar from the channel for replacement or reversal of its operative position. When the bar is properly positioned in the channel member, it may be retained against endwise movement by an appropriate screw 38 in each case; this screw being rotatably supported in the bridging wall 26 of the channel member, and being threadedly engagable with an appropriate threaded opening formed in the associated bar 34.

The releasably attachable bracket 18, as best shown in FIGS. 1 and 2, comprises an elongate strap-like spring 40, which is fitted at each end with magnetic means, as generally indicated at 42, for removably attaching the bracket to the respective surfaces of the workpieces which are being interconnected by the weld seam. While magnetic means has been described for attaching the bracket 18, it is within the contemplated scope of the present invention, that in the case of non-magnetic workpieces such as aluminum, stainless steel or the like, suction cups may be utilized instead of the magnets.

Each magnetic means 42 comprises a cup-shaped housing 44, the bottom of which is secured to the end of the spring 40 by means of a suitable retaining screw 46 having a threaded shank which extends through the end of the spring and centrally of the bottom of the cup-shaped housing for threaded engagement with a fastening nut 48. A permanent magnet 50 of annular configuration is bondingly secured in the cup shaped housing in surrounding relation to the nut 48. As thus mounted, the magnet has an exposed end surface which is slightly recessed with respect to the brim of the cup-shaped housing so that the magnetized brim will adhere to the adjacent surface of the workpiece.

Figure 3:
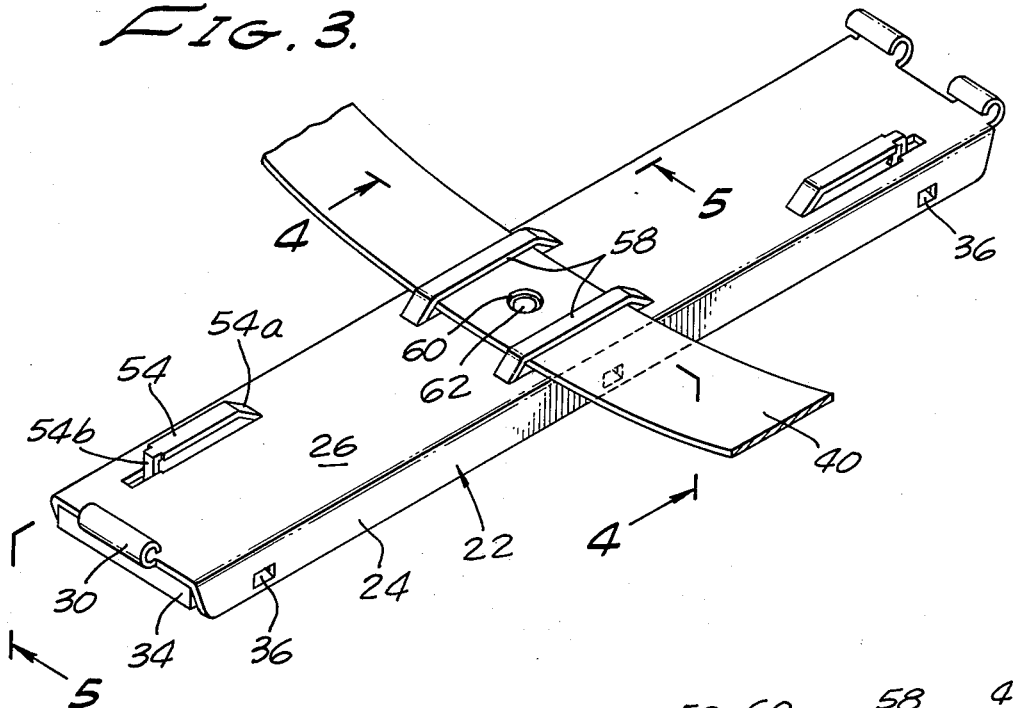
FIG. 3 is an enlarged fragmentary perspective view showing a modified arrangement for securing certain of the parts in captive relationship.
Figure 4:
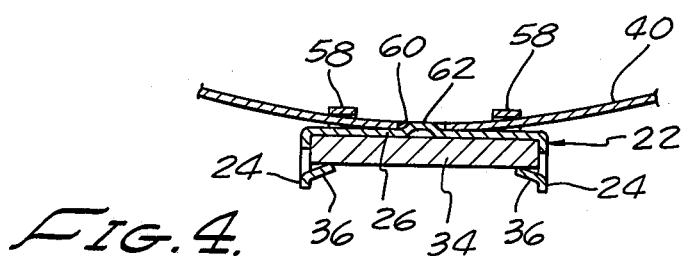
FIG. 4 is a fragmentary transverse section, taken substantially on line 4—4 of FIG. 3.
Figure 5:
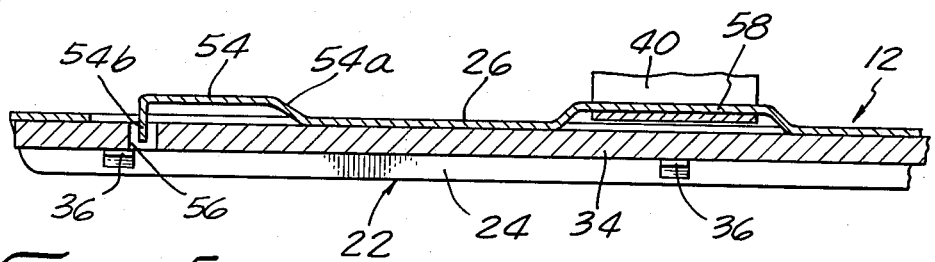
FIG. 5 is an enlarged fragmentary longitudinal section taken substantially on line 5—5 of FIG. 3.
Figure 6:
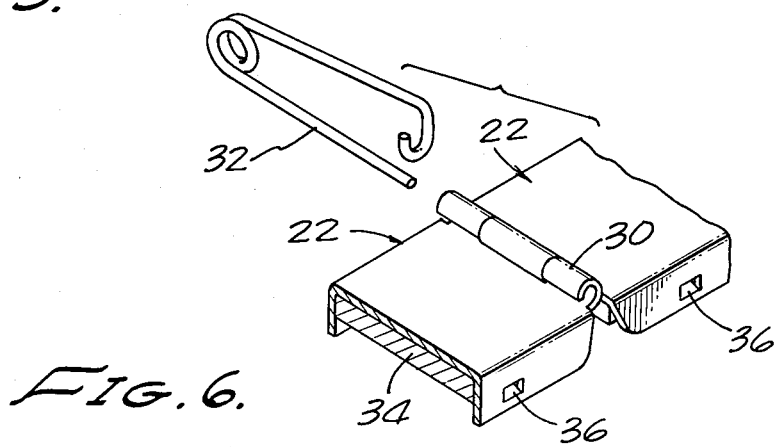
FIG. 6 is a fragmentary perspective view, partly in section, illustrating a hinged connection for connecting holder sections in end-to-end relation by means of a removable hinge pin.

The central portion of the spring 40 is preferably bowed so that, when the spring is positioned in bridging relation to one of the tape holding structures 12, the magnetic means 42 at each end of the spring will be in spaced relation to the adjacent surface of the associated workpiece, as shown in phantom lines in FIG. 2. In order to complete the attachment of the bracket in its operative position, the respective magnetic means 42 will be forced into engaged positions with the workpieces to which they will magnetically adhere, as shown in full lines in FIG. 2. One of the magnetic means is provided with a finger engagable tilting lever 52 of generally Z-shaped configuration, one end of the lever being anchored by the screw 46. By engaging a finger under the free end of this lever and applying a tilting force thereagainst, the associated magnet 50 will be tilted and thus released from its magnetic engagement with the associated workpiece. Removal of the respective brackets 18 is thus greatly facilitated. In the arrangement of the magnetically attachable bracket 18, as previously described, it will be appreciated that these brackets are independent with respect to the tape holding structures, and may be selectively placed in any desired position along the associated tape holding structure. In a modified arrangement, as shown in FIGS. 3–5, attaching means are provided for attaching the tape holding structure 12 in captivated relation with respect to each of the magnetically attachable brackets 18. Also, other alternative means are shown for retaining the bar 34, in each case, against endwise removal from its associated channel member 22.

More specifically in this form of the invention, the bar 34 is retained against longitudinal movement by means of a flexible finger 54 which is struck-out of the bridging wall 26 of the channel member 22, this finger having an anchored end 54a and a deflected free end which forms an inwardly extending projection 54b. As thus arranged, the finger 54b extends into an opening 56 in the bar 34 in a manner to normally retain the bar against longitudinal endwise movements, but upon flexing of the finger to withdraw the projection 54b, the bar may then be longitudinally moved in and endwise direction.

For captivating the spring 40, the bridging wall 26, preferably at a generally midway position between the ends of the channel member 22, is formed with a pair of longitudinally extending and laterally spaced struck-up closed loops 58. These loops are of a length such that, with the spring 40 extending lengthwise therethrough, the loops will serve to retain the spring against edgewise tilting movements, and in a position extending generally in transverse relation to the longitudinal axis of the channel member 22 with which it is associated. Means are also provided for retaining the spring 40 against longitudinal movements within the loops; and for this purpose, the spring 40 may be centrally provided with an opening 60 which is adapted to receive a raised projection 62, which may be struck-out or otherwise formed from the material in the bridging wall 26 of the channel member.

From the foregoing description and drawings, it will be clearly evident that the delineated objects and features of the invention will be accomplished.

Various modifications may suggest themselves to those skilled in the art, without departing from the spirit of my invention, and, hence, I do not wish to be restricted to the specific forms as shown, or uses as mentioned, except to the extent indicated in the appended claims.

I claim:

1. A welding seam back-up means for mounting on the back side of the adjacently positioned edge margins of members to be joined by a weld seam, comprising:
   a. an elongated tape of flexible material adapted to be positioned in straddling relation over said adjacent edge margins and extending longitudinally therealong;
   b. tape holding means adapted to be positioned over said tape; and
   c. means for releasably securing said tape holding means and applying pressure in a direction to force the tape against the adjacent edge margins comprising a plurality of attaching brackets for mounting at spaced intervals longitudinally of the tape holding means and adapted to transversely straddle the tape holding means, each of said brackets including:
   an elongate longitudinally bowed strap-like spring; and
   a magnet connected to each end of said spring;
   whereby with the bowed spring engaged between its ends with the tape holding means, the magnets will be initially respectively in spaced relation to the members to be joined by the weld, and upon movement of the magnets into engagement with said members, will deform and activate the bowed spring so as to apply a holding pressure against said tape holding means.

2. Welding seam back-up means according to claim 1, in which:
   one of said magnets carries a finger engageable tilting lever.

3. Welding seam back-up means according to claim 1, in which:
   each of said magnets is mounted within a cupped housing member; and
   means releasably secures the cupped members respectively to the ends of said spring.

4. Welding seam back-up means according to claim 1, in which:
   the tape holding means comprises an elongated channel member having a bottom wall portion formed with at least one struck-out longitudinally extending closed loop portion; and
   said bowed spring being retained in connected captive relation to the channel member by means of said loop portion.

5. Welding seam back-up means according to claim 4, in which:
   the bottom wall portion of the channel member has a pair of said closed loop portions in transversely aligned spaced relation;
   whereby the captively retained spring is held in a fixed angular relation with respect to the longitudinal axis of said channel member.

6. Welding seam back-up means according to claim 4, which includes:
   interconnecting means between said spring and channel member for retaining the captive spring member against relative longitudinal movements in said closed loop portion.

7. Welding seam back-up means according to claim 6, in which:

said interconnecting means includes a raised projection formed on the channel bottom wall portion, and an opening in said spring adapted to receive said projection endwise therein.

8. A welding seam back-up means for mounting on the back side of the adjacently positioned edge margins of members to be joined by a weld seam, comprising:
   a. an elongate tape of flexible material adapted to be positioned in straddling relation over the adjacent edge margins and extending longitudinally therealong;
   b. tape holding means adapted to be positioned over said tape;
   c. means for releasably securing said tape holding means and applying pressure in a direction to force the tape against said adjacent edge margins;
   d. said holding means comprising:
      a plurality of pairs of tape engaging structures interconnected in end-to-end relation;
      hinge means permanently interconnecting the abutting ends of the tape engaging structures of each pair; and
      hinge means releasably interconnecting the abutting ends of the respective pairs, including a manually engageable and disengageable hinge pin,
      whereby the number of pairs of tape engaging structures may be selectively varied to accomodate the seam back-up means for weld seams of different required lengths.

9. As an article of manufacture, an attaching bracket for use in magnetically releasably securing a rigid holder for a back-up flexible tape in an operative position extending along the back side of a weld seam when making a oneside weld between a pair of workpieces, comprising
   an elongated longitudinally bowed strap-like spring; and
   magnets respectively at the opposite ends of said spring;
   whereby with the non-stressed spring extending across and engaged between its ends with the back-up tape holder, the magnets will be positioned respectively in spaced relation to an adjacent surface of one of the associated workpieces, and upon movement of the magnets into holding engagement with the surfaces, the spring will be stressed in a manner to apply a holding pressure to the back-up tape holder.

10. A welding seam back-up means for mounting on the back side of the adjacently positioned edge margins of members to be joined by a weld seam, comprising:
    a. an elongate tape of flexible material adapted to be positioned in straddling relation over the adjacent edge margins and extending longitudinally therealong;
    b. tape holding means comprising an elongate channel member having a low heat sink capability adapted to be positioned over and to receive said tape therewithin and extending therealong;
    c. an elongate separate bar of a material having a high heat conducting characteristic positioned in the channel in underlying relation to said tape to provide a high heat sink capability;
    d. means for releasably retaining said bar within said channel including a screw rotatably supported in said channel and having threaded engagement with said bar; and
    e. means for releasably securing said tape holding means and applying pressure in a direction to force the tape against the adjacent edge margins.

11. A welding seam back-up means for mounting on the back side of the adjacently positioned edge margins of members to be joined by a weld seam, comprising:
    a. an elongate tape of flexible material adapted to be positioned in straddling relation over the adjacent edge margins and extending longitudinally therealong;
    b. tape holding means comprising an elongate channel member having a low heat sink capability adapted to be positioned over and to receive said tape therewithin and extending therealong;
    c. an elongate separate bar of a material having a high heat conducting characteristic positioned in the channel in underlying relation to said tape to provide a high heat sink capability;
    d. means for releasably retaining said bar within said channel including struck-out nibs on sidewall portions of said channel; and
    e. means for releasably securing said tape holding means and applying pressure in a direction to force the tape against the adjacent edge margins.

12. A welding seam back-up means for mounting on the back side of the adjacently positioned edge margins of members to be joined by a weld seam, comprising:
    a. an elongate tape of flexible material adapted to be positioned in straddling relation over the adjacent edge margins and extending longitudinally therealong;
    b. tape holding means comprising an elongate channel member having a low heat sink capability adapted to be positioned over and to receive said tape therewithin and extending therealong;
    c. an elongate separate bar of a material having a high heat conducting characteristic positioned in the channel in underlying relation to said tape to provide a high heat sink capability;
    d. means for releasably retaining said bar within said channel including a flexibly supported inwardly struck projecting portion formed in a bottom wall of the channel member adapted to extend into an opening found in said bar; and
    e. means for releasably securing said tape holding means and applying pressure in a direction to force the tape against the adjacent edge margins.

* * * * *